Dec. 20, 1949 J. ALFONSO 2,491,543
RELEASE NUT
Filed May 7, 1948
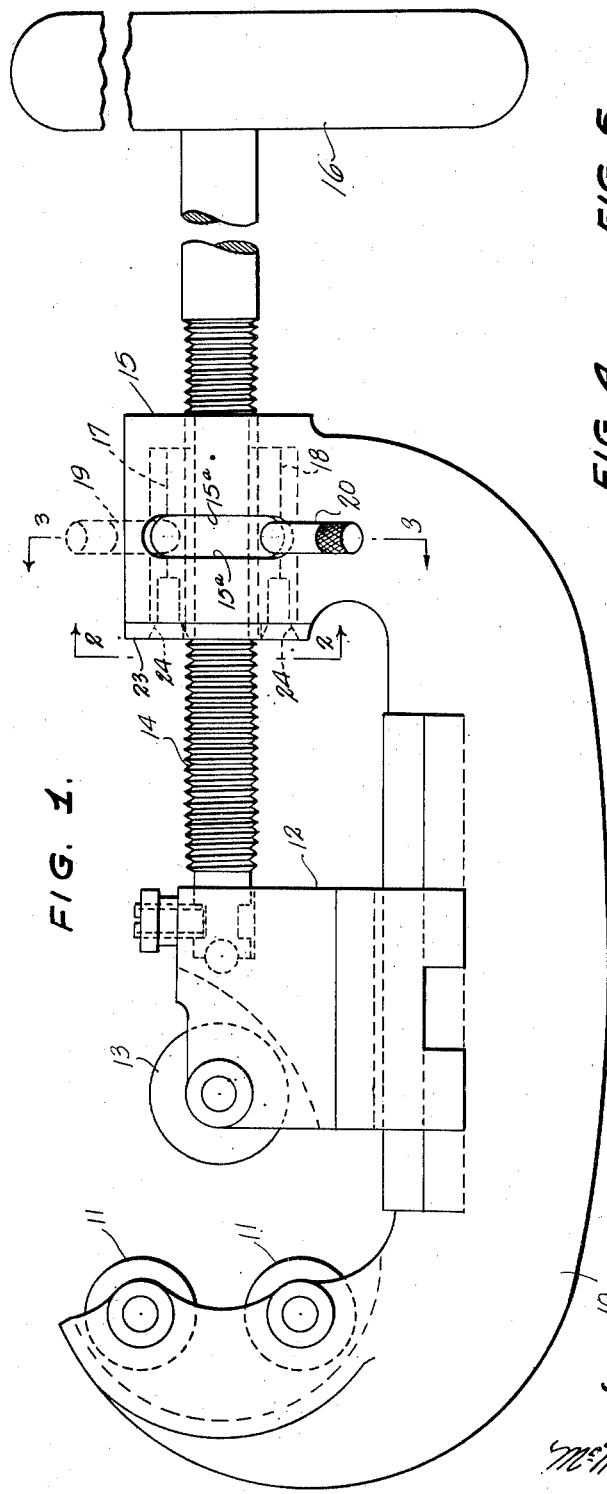
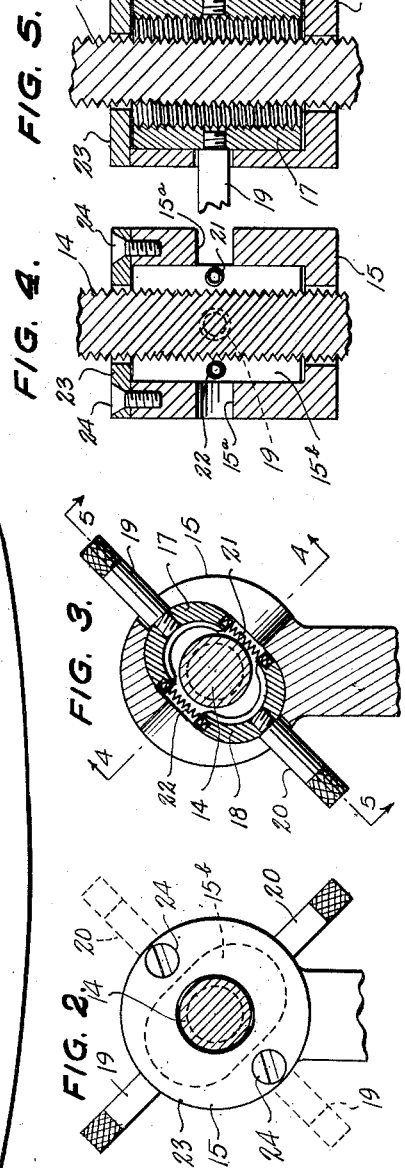
INVENTOR.
JOSEPH ALFONSO,
BY
McMorrow, Berman & Davidson
ATTORNEYS.

Patented Dec. 20, 1949  2,491,543

UNITED STATES PATENT OFFICE 2,491,543

RELEASE NUT

Joseph Alfonso, Bethlehem, Pa.

Application May 7, 1948, Serial No. 25,649

1 Claim. (Cl. 74—424.8)

This invention relates to a release nut, and more particularly to a machine nut that will permit of quick release so that axial positioning of the nut on a machine screw may be readily accomplished.

An object of this invention is to provide a machine nut of such design and arrangement that it may be conveniently released to permit rapid placing or positioning on a machine screw or removed therefrom without the necessity of screwing or unscrewing throughout the length of the active portion of the screw thread.

Another object is to provide a machine nut whereby its axial position on a machine screw may be conveniently and rapidly accomplished by rotating a part thereof a fraction of a revolution.

A further object is to provide a simple and relatively inexpensive machine nut which may be conveniently locked on or released from a machine screw by successive fractional rotation thereof.

Other objects and advantages will become apparent from the following description when taken in conjunction with the accompanying drawing, in which:

Figure 1 is a side elevation of a pipe cutting tool on the threaded shaft of which the release nut of this invention is applied, Figure 2 is a sectional end elevation taken along line 2—2 of Figure 1, Figure 3 is a sectional end elevation taken along line 3—3 of Figure 1, Figure 4 is a sectional view taken along line 4—4 of Figure 3, and Figure 5 is a sectional view as would prevail along line 5—5 of Figure 3 when the threads of the nut are not in engagement with the screw threads.

In Figure 1 a pipe cutting tool comprising frame 10, stationary cutters 11, sliding head 12, movable cutter 13, screw shaft 14, screw head or housing 15, and handle 16, is shown provided with a release nut of this invention consisting of two semi-circular threaded halves 17 and 18 (Figure 3) each provided with an extending handle or arm 19 and 20 respectively, and a pair of compression springs 21 and 22 seated in depressions in the opposed corresponding cleavage side of the nut halves 17 and 18.

A stationary nut housing or head 15, shown in the drawing as an integral part of the pipe-cutter, is provided with an elongated recess 15b having semi-circular ends of a radius similar to that of the halves 17 and 18 of the nut forming an eccentric orbital opening in which the nut halves are placed, and two fractional diametrical slots formed by walls 15a through which the nut arms 19 and 20 protrude in such manner as to permit manual rotation of the nut halves 17 and 18 into locking engagement with the thread of the screw shaft 14, or to release the nut halves from the screw shaft for axial positioning thereon or removal therefrom.

It will be readily seen that, due to the shape of the aperture in the head or housing 15, a fractional revolution of the nut halves 17 and 18 will cause them to engage or disengage the thread of the screw depending upon the direction of revolution they are given.

When the nut halves are rotated to released position compression springs 21 and 22 will force them apart and thereby automatically disengage the screw 14.

A cover retaining plate 23 secured to the nut housing or head 15 by means of machine screws 24, or in any other suitable manner, is provided for the purpose of retaining the nut halves 17 and 18 within the head or housing 15 against axial thrust.

It will be understood that the nut housing or head 15 may be a separate part and adapted to be attached or secured to any tool or device on which it may be desired thus becoming a unit of the nut assembly.

It will also be understood that various changes and modifications may be made in this invention without departing from the spirit and scope thereof as set forth in the appended claims.

What is claimed is:

In a release nut assembly comprising a hollow housing having aligned circular openings in the ends thereof, a threaded shaft extending rotatably through the hollow housing and projecting out through the circular aligned openings at both ends thereof, and a pair of semi-circular nut halves adapted to fit said threaded shaft and located within said hollow housing with the corresponding cleavage sides thereof facing each other, the features which include a pair of compression springs disposed between the facing cleavage sides of the semi-circular nut halves to bias them apart and out of engagement with the threaded shaft, the interior of said hollow housing being transversely of said shaft of sufficient cross-sectional diameter in one angular direction with respect to said threaded shaft to receive said semi-circular nut halves in the separated condition out of contact with the latter shaft, and in another angular direction with respect to said threaded shaft at right angles to said first angular direction having the interior of the hollow housing of a transversely reduced cross-sectional diameter restricting said semi-circular nut halves to closed condition in threaded engagement with said threaded shaft, a pair of opposite open slots in the sides of said hollow housing intermediate the ends thereon leading to the interior thereof, and a pair of nut arms individually secured to the intermediate convex portions of said semi-circular nut halves and extending out through said open slots into manually accessible position externally of said housing, whereby said nut arms may partly rotate said nut halves from their separated position to their closed position within said hollow housing in order to release said nut halves from or engage them with said threaded shaft at will.

JOSEPH ALFONSO.

REFERENCES CITED

The following references are of record in the file of this patent:

UNITED STATES PATENTS

| Number | Name | Date |
|---|---|---|
| 463,301 | Brandner | Nov. 17, 1891 |
| 1,630,735 | Ferrell | May 31, 1927 |
| 1,678,731 | Klauset | July 31, 1928 |
| 2,071,756 | Manville | Feb. 23, 1937 |